US010885324B2

(12) United States Patent
An et al.

(10) Patent No.: US 10,885,324 B2
(45) Date of Patent: Jan. 5, 2021

(54) AGENCY NOTICE PROCESSING SYSTEM

(71) Applicant: ADP, LLC, Roseland, NJ (US)

(72) Inventors: Hongguo An, Pasadena, CA (US); Srinivas Goda, Hyderabad (IN); Rajat Gupta, Hyderabad (IN); Harshvardhan Prasad, Hyderabad (IN); Nikhil Choudhari, Hyderabad (IN); Praison Selvaraj, Hyderabad (IN); Anuradha Verma, Alpharetta, GA (US); Atul Bochare, Pasadena, CA (US); Arjun Hegde, Pasadena, CA (US); Sanjay Kutty, Pasadena, CA (US); Abhishek Jain, Pasadena, CA (US); Michael Pionski, Pasadena, CA (US)

(73) Assignee: ADP, LLC, Roseland, NJ (US)

( * ) Notice: Subject to any disclaimer, the term of this patent is extended or adjusted under 35 U.S.C. 154(b) by 95 days.

(21) Appl. No.: 16/381,284

(22) Filed: Apr. 11, 2019

(65) Prior Publication Data

US 2020/0327319 A1    Oct. 15, 2020

(51) Int. Cl.

| G06K 9/00 | (2006.01) |
| G06K 9/62 | (2006.01) |
| G06N 3/08 | (2006.01) |
| G06F 40/169 | (2020.01) |
| G06F 40/295 | (2020.01) |

(52) U.S. Cl.
CPC ....... *G06K 9/00449* (2013.01); *G06F 40/169* (2020.01); *G06F 40/295* (2020.01); *G06K 9/6257* (2013.01); *G06N 3/08* (2013.01)

(58) Field of Classification Search
CPC   G06K 9/00449; G06K 9/6257; G06F 40/169; G06F 16/583; G06N 3/08
See application file for complete search history.

(56) References Cited

U.S. PATENT DOCUMENTS

| 7,249,117 | B2 | 7/2007 | Estes | |
| 8,196,030 | B1 | 6/2012 | Wang et al. | |
| 2002/0078088 | A1* | 6/2002 | Kuruoglu | G06F 40/169 |
| | | | | 715/232 |
| 2006/0009966 | A1* | 1/2006 | Johnson | G06F 40/205 |
| | | | | 704/10 |
| 2009/0070325 | A1 | 3/2009 | Gabriel et al. | |
| 2012/0072859 | A1* | 3/2012 | Wang | G06K 9/00442 |
| | | | | 715/764 |
| 2018/0268506 | A1* | 9/2018 | Wodetzki | G06K 9/6885 |

\* cited by examiner

*Primary Examiner* — Yogeshkumar Patel

(74) *Attorney, Agent, or Firm* — Yee & Associates, P.C.

(57) ABSTRACT

Training an artificial intelligence system to process agency notices. The process identifies historical data that includes historical text generated from optical character recognition performed on historical images of the agency notices and historical metadata for items in the historical images of the agency notices. The process generates annotations for the historical text. The annotations identify the items in the historical text and locations of the items in the historical text. The process trains the artificial intelligence system using the historical data and the annotations.

28 Claims, 10 Drawing Sheets

AGENCY NOTICE PROCESSING SYSTEM

BACKGROUND INFORMATION

1. Field

The present disclosure relates generally to an improved computer system and in particular, processing images of documents. Still more particularly, present disclosure relates to a method, an apparatus, a system, and a computer program product for processing agency notices using an artificial intelligence system.

2. Background

An organization often receives agency notices from various government agencies. For example, the organization may receive documents in the form of a garnishment notice, a state income tax rate change notice, an unemployment claim notification, and other types of agency notices from local, state, and federal government agencies. When the organization uses a human resources management company to manage compliance with these agency notices, the organization sends the documents for these agency notices to the human resources management company for processing.

These agency notices can come from many different jurisdiction levels and agencies. For example, each city may have its own unemployment forms. An agency notice can be received as a paper document. When the agency notice is received as a paper document, that agency notice is scanned for processing. The scanning can include generating an image of the paper document and performing optical character recognition. If agency notice is received as an image, text can be recognized using optical character recognition.

When an agency notice is scanned, initial processing is performed on this notice to identify items needed for further processing of the notice. For example, items such as agency information, amount, an employer identifier, an organization name, notice periods, net estate, form number, and other information can be identified.

Currently, agency notices are manually inspected and metadata for these items are created and manually entered by a user in the human resources management company. Often times, the metadata is not accurate, complete, or some combination thereof. As a result, further processing the agency notice is required to detect these deficiencies and fix these deficiencies. This process is time-consuming and expensive for the human resources management company.

Therefore, it would be desirable to have a method and apparatus that take into account at least some of the issues discussed above, as well as other possible issues. For example, it would be desirable to have a method and apparatus that overcome a technical problem with identifying metadata for items in an agency notice needed to process the agency notice.

SUMMARY

An embodiment of the present disclosure provides a method for training an artificial intelligence system to process agency notices. The process identifies historical data that includes historical text generated from optical character recognition performed on historical images of the agency notices and historical metadata for items in the historical images of the agency notices. The process generates annotations for the historical text. The annotations identify the items in the historical text and locations of the items in the historical text. The process trains the artificial intelligence system using the historical data and the annotations.

Another embodiment of the present disclosure provides an artificial intelligence training system comprising a computer system. The computer system identifies historical data that includes historical text generated from optical character recognition performed on historical images of agency notices and historical metadata for items in the historical images of the agency notices. The computer system generates annotations for the historical text. The annotations identify items in the historical text and locations of the items in the historical text. The computer system trains the artificial intelligence system using the historical data and the annotations.

Yet another embodiment of the present disclosure provides an artificial intelligence training system comprising a computer system; a data loader in the computer system, an annotator in the computer system, a trainer in the computer system, and a validator in the computer system. The data loader retrieves historical data that includes historical text generated from optical character recognition performed on historical images of agency notices and historical metadata for items in the historical images of the agency notices. The data loader retrieves validation data. The validation data includes validation text generated from optical character recognition performed on validation images of additional agency notices and validation metadata for the items in the validation images of the additional agency notices. The annotator generates annotations for the historical text in which the annotations identify items and locations of the items in the historical text. The trainer trains the artificial intelligence system using the historical data and the annotations. The validator sends validation text to the artificial intelligence system, receives results from the artificial intelligence system processing the validation text, and determines whether the artificial intelligence system identifies the items in the validation images within a desired level of accuracy.

Still another embodiment of the present disclosure provides a computer program product for training an artificial intelligence system to process agency notices, the computer program product comprises a computer-readable-storage media with first program code, second program code, and third computer-readable-storage media stored on the computer-readable storage media. First program code runs to identify historical data that includes historical text generated from optical character recognition performed on historical images of the agency notices and historical metadata for items in the historical images of the agency notices. The second program code runs to generate annotations for the historical text, wherein the annotations identify items in the historical text and locations of the items in the historical text. The third program code runs to train the artificial intelligence system using the historical data and the annotations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that a template based optical character recognition (OCR) system can be used to process agency notices. With a template based optical recognition system a template with structured layout is used to guide the optical character recognition process. With this process, items in the agency notice needed for processing the agency notice are identified based on the expected structure of the agency notice. In other words, a field such as agency information may be expected at the top center of agency notice, employment identifier may be 2 inches down on the left side of the agency notice, and other information may be expected in other locations within the agency notice.

The illustrative embodiments recognize and take into account that this type of technique is difficult to implement successfully because of the number of different types of form templates needed to process agency notices. The illustrative embodiments recognize and take into account that a number of different types of template forms needed could be hundreds or thousands of template forms. Further, the illustrative embodiments recognize and take into account that changes in formatting or structure of agency notices makes the templates obsolete, requiring updates to existing template forms or the generation of new template forms.

Figure 1:
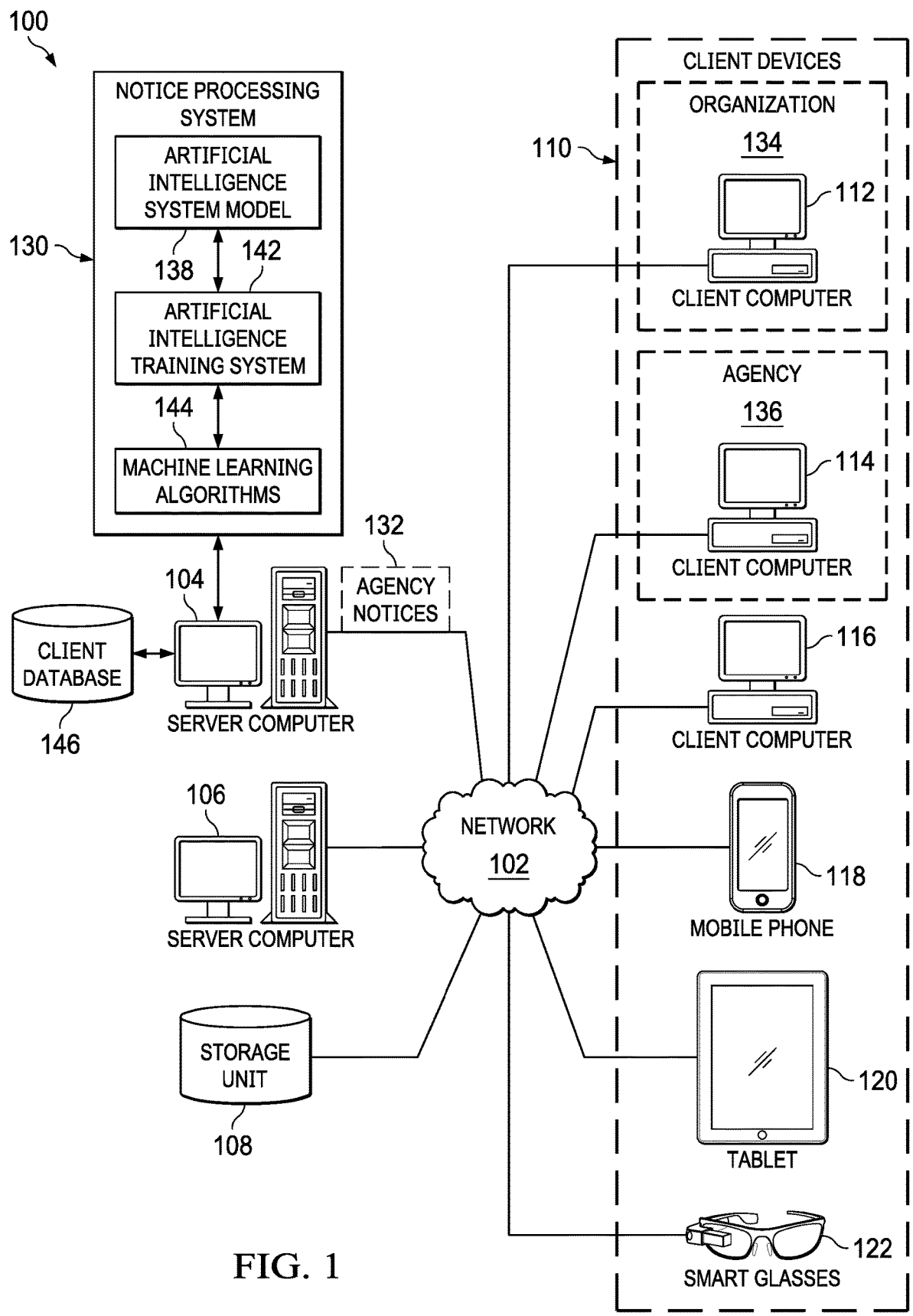
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, notice processing system 130 in server computer 104 receives agency notices 132 for processing. In this illustrative example, agency notices 132 can originate from a number of different sources.

For example, organization 134 can be a client or customer that uses notice processing services in notice processing system 130. Client computer 112 in organization 134 can send agency notices 132 to notice processing system 130. Organization 134 can take a number of different forms. Organization 134 can be, for example, a business, a partnership, a corporation, a nonprofit entity, or some other suitable type of organization.

As another illustrative example, notice processing system 130 can be a designated receiver of agency notices 132 for organization 134. In this example, agency notices 132 are sent from client computer 114 in agency 136 to notice processing system 130.

Agency 136 can take a number of different forms. For example, agency 136 can be a city, state, a regulatory agency, a state government agency, a federal government agency, or some other suitable type of agency.

In this illustrative example, artificial intelligence system model 138 in notice processing system 130 can process agency notices 132. As depicted, agency notices 132 can be received as images in which each notice can be one or more images. If agency notices 132 are received as paper documents, the paper documents are scanned to form images.

Images are processed using optical character recognition to generate text for agency notices 132. This text is processed by artificial intelligence system model 138 to perform steps needed to process agency notices 132 for organization 134.

In this illustrative example, artificial intelligence system model 138 is trained using artificial intelligence training system 142 in notice processing system 130.

As depicted, artificial intelligence training system 142 employs machine learning algorithms 144 to train artificial intelligence system model 138. In this illustrative example, training is performed using historical data, which includes text for previously processed agency notices and metadata describing items in the previously processed agency notices.

The metadata is information that can be stored in client database 146 for clients such as organization 134. This metadata contains information that is used to perform various operations and provide services to clients such as organization 134. The services may include, for example, tax withholdings, reporting to agencies, or other types of services.

Artificial intelligence training system 142 generates annotations that identify the items in the text. The historical data and the annotations are used with a number of machine learning algorithms 144 to train artificial intelligence system model 138.

The illustrative examples for training artificial intelligence systems to take into account that the text, metadata, and annotations can be used by machine learning algorithms to train an artificial intelligence system to identify metadata for items in agency notices even though exact matches may not be present between a search for values for the metadata in the text corresponding to those items in the agency notice.

For example, a company name may be EFG, LTD in the metadata in client database 146. However, the text in the agency notice may be EFG, Limited. The use of annotations enables training the artificial intelligence system to take account and learn about differences in at least one of formatting, how the same item can be represented in text differently, or other type of differences that may occur.

In this illustrative example, incremental training of artificial intelligence system model 138 can be performed with additional historical data and annotations. For example, artificial intelligence system model 138 can be trained and then put into use to process agency notices. Artificial intelligence model 138 can be trained again after processing some agency notices and then again used to process agency notices. These training and processing steps can be performed repeatedly, increasing the accuracy of artificial intelligence system model 138.

Figure 2:
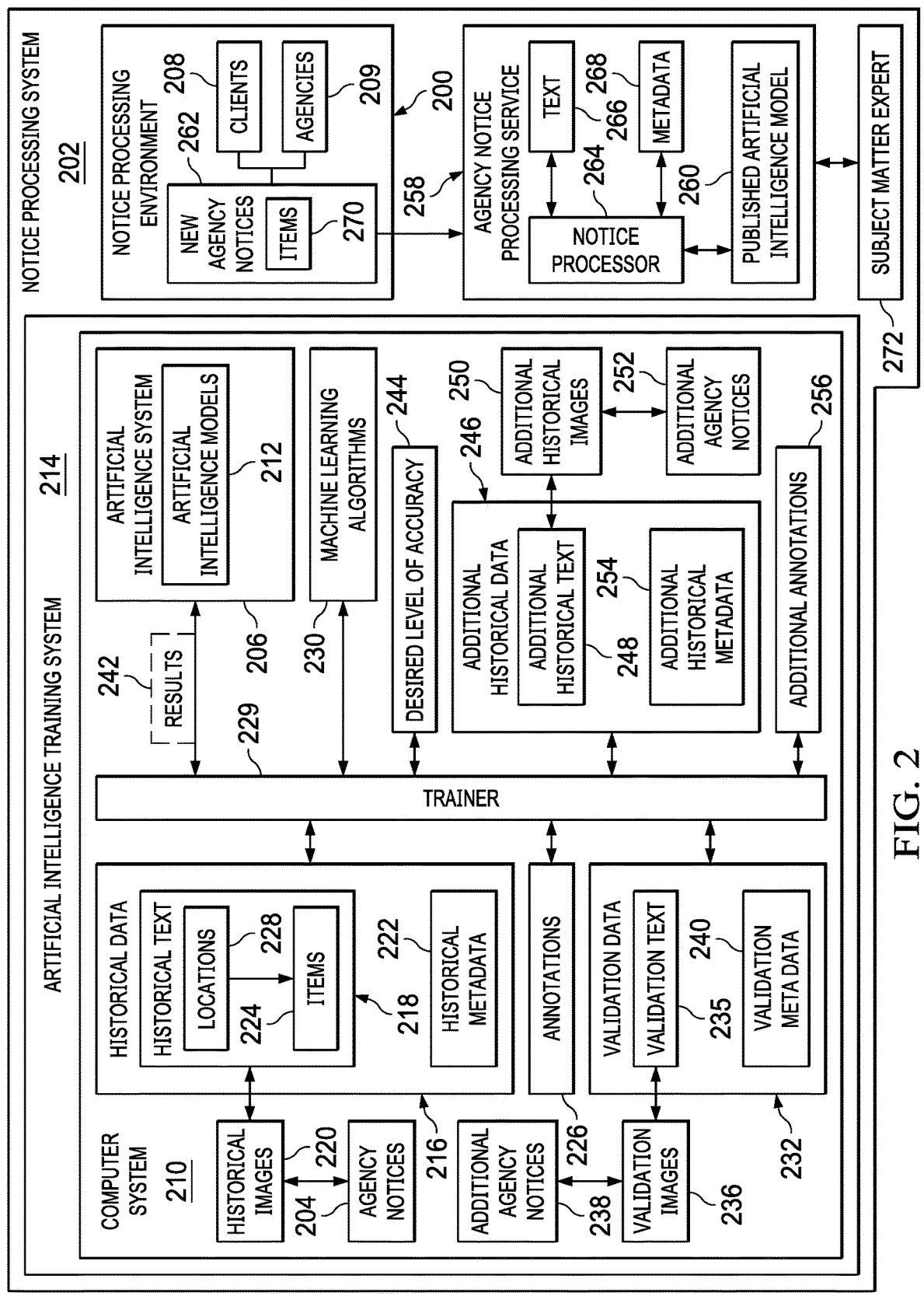
FIG. 2 is a block diagram of a notice processing environment in accordance with an illustrative embodiment.

With reference now to FIG. 2, a block diagram of a notice processing environment is depicted in accordance with an illustrative embodiment. In this illustrative example, notice processing environment 200 includes components that can be implemented in hardware such as the hardware shown in network data processing system 100 in FIG. 1.

In this illustrative example, notice processing system 202 operates to process agency notices 204 using artificial intelligence system 206 for clients 208 selected from at least one of an organization, a company, an individual, a partnership, a charity, a city, or some other suitable type of client. As depicted, agency notices 204 can be sent by clients 208 to notice processing system 202, by agencies 209, or some combination thereof.

In this illustrative example, artificial intelligence system 206 can be used to more accurately process agency notices 204 as compared to using a template based optical recognition system.

An artificial intelligence system is a system that has intelligent behavior and can be based on function of the human brain. An artificial intelligence system comprises at least one of an artificial neural network, and artificial neural network with natural language processing, a cognitive system, a Bayesian network, a fuzzy logic, an expert system, a natural language system, a cognitive system, or some other suitable system.

Machine learning is used to train the artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

In this illustrative example, artificial intelligence system 206 is located in computer system 210 and comprises a set of artificial intelligence models 212. When trained, each of these artificial intelligence models be used to process agency notices 204.

Computer system 210 is a physical hardware system and includes one or more data processing systems. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, trainer 229 in artificial intelligence training system 214 in computer system 210 operates to train artificial intelligence system 206 for use in processing agency notices 204. In other words, artificial intelligence training system 214 trains one or more of artificial intelligence models 212.

Trainer 229 can be implemented in software, hardware, firmware or a combination thereof. When software is used, the operations performed by trainer 229 can be implemented in program code configured to run on hardware, such as a processor unit. When firmware is used, the operations performed by trainer 229 can be implemented in program code and data and stored in persistent memory to run on a processor unit. When hardware is employed, the hardware may include circuits that operate to perform the operations in trainer 229.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, trainer 229 identifies historical data 216 that includes historical text 218 generated from optical character recognition performed on historical images 220 of agency notices 204 and historical metadata 222 for items 224 in the historical images 220 of agency notices 204. In this illustrative example, historical data 216 is generated from previous processing of agency notices 204. In this illustrative example, optical character recognition involves, for example, converting images of text in an image of a document into machine-encoded text. the image can be, for example, of typed, handwritten, or printed text. The image can be a scanned document, a photo of a document, or some source in which a conversion of text in the image into text that is processable by a data processing system can occur.

Items 224 can take a number of different forms. For example, items 224 can comprise of least one of an agency, a client organization, a notice type, an amount, notice period, agency name, an agency address, agency contact, an agency state, a company name, an employer identifier, a notice date, a notice period, a form number, or other type of item identifying information in the text that is needed to process an agency notice.

In this illustrative example in training artificial intelligence system 206, trainer 229 generates annotations 226 for historical text 218. In this illustrative example, annotations 226 identify items 224 in historical text 218 and locations 228 of items 224 in historical text 218.

Trainer 229 trains artificial intelligence system 206 using historical data 216 and annotations 226. As depicted, trainer 229 in computer system 210 trains artificial intelligence system 206 using historical metadata 222 in historical data 216, historical text 218 in historical data 216, and annotations 226. As depicted, the training is performed using a set of machine learning algorithms 230.

In this illustrative example, trainer 229 can validate training performed on artificial intelligence system 206. As depicted, trainer 229 identifies validation data 232. Validation data 232 includes validation text 235 generated from the optical character recognition performed on the validation images 236 of additional agency notices 238 and validation metadata 240 for the items 224 in validation images 236 of additional agency notices 238.

Trainer 229 sends validation text 235 to artificial intelligence system 206, and receives results 242 from artificial intelligence system 206 processing validation text 235. Trainer 229 analyzes results 242 to determine whether artificial intelligence system 206 identifies items 224 in validation text 235 with a desired level of accuracy 244.

In this illustrative example, in response to the desired level of accuracy being absent in the artificial intelligence system, trainer 229 performs additional training of artificial intelligence system 206 using additional historical data 246 that includes additional historical text 248 generated from the optical character recognition performed on the additional historical images 250 of additional agency notices 252 and additional historical metadata 254 for items 224 in additional historical images 250 of additional agency notices 252 and using additional annotations 256 identifying items 224 and locations 228 of items 224 in additional historical text 248.

Trainer 229 trains artificial intelligence system 206 using a first machine learning algorithm in the set of machine learning algorithms 230. Responsive to desired level of accuracy 244 being absent, trainer 229 performs additional training of artificial intelligence system 206 using historical data 216 and annotations 226 and a second machine learning algorithm in the set of machine learning algorithms 230. In other illustrative examples, additional historical data 246 and additional annotations 256 can be used for additional training of artificial intelligence system 206 using second machine learning algorithm in the set of machine learning algorithms 230.

In this illustrative example, historical data 216 is organized using a first type of clustering for the machine learning training. Trainer 229 performs additional training of artificial intelligence system 206 using historical data 216 organized using a second type of clustering and annotations 226 in response to the desired level of accuracy 244 being absent.

For example, clustering can be a grouping of historical data 216 by notice type, state, city, county, date ranges, or other suitable types of grouping constructs for historical data 216. Changing the clustering of data can improve accuracy or result quicker increases in accuracy of artificial intelligence system 206.

In the illustrative example, after training of artificial intelligence models 212, new agency notices 262 can be processed for clients 208 using artificial intelligence system 206 after artificial intelligence system 206 has been trained using historical data 216 and annotations 226. For example, one or more of artificial intelligence models 212 can be selected for use in processing new agency notices 262.

For example, agency notice processing service 258 can implement and use published artificial intelligence model 260 selected from artificial intelligence models 212 to process new agency notices 262 received from at least one of clients 208 or agencies 209. Published artificial intelligence model 260 is an artificial intelligence model that is made available for processing agency notices for clients 208.

As depicted, notice processor 264 in agency notice processing service 258 can receive new agency notices 262 from clients 208, agencies 209, or both. As depicted, images of new agency notices 262 are processed by notice processor 264 using optical character recognition to obtain text 266. Notice processor 264 uses published artificial intelligence model 260 process text 266 to obtain metadata 268 for items 270 in text 266. Metadata 268 for items 270 can comprise at least one of an agency name, an agency address, an agency contact, an agency state, a company name, an employer identifier, an amount, a notice date, a notice period, a form number, or other suitable information needed to process the new agency notices 262.

In this illustrative example, with metadata 268, notice processor 264 can perform a number of different steps. For example, notice processor 264 can perform at least one of matching agency information for agencies 209 identified in the new agency notices 262 to an agency database, matching company names in new agency notices 262 to profiles for clients 208, formatting data, updating tax information, generating reports, generating alerts, or other suitable steps needed to process new agency notices 262.

In this illustrative example, if one or more of items 270 for a notice in new agency notices 262 cannot be identified from text 266, the agency notice can be forwarded to subject matter expert 272. Subject matter expert 272 can be a person, an expert system, or other process that can generate metadata 268 for items 270 in the agency notice. The results returned by subject matter expert system 272 can be added to historical data 216 for use in further training of artificial intelligence models 212.

In these illustrative examples, artificial intelligence models 212 can continue to be trained incrementally over time to learn how the process new agency notices 262. For example, forms, formats, other aspects of the new agency notices 262 can change over time. As a result, machine training can increase the ability of artificial intelligence models 212 to accurately and efficiently process new agency notices 262.

In one illustrative example, one or more technical solutions are present that overcome a technical problem with identifying metadata for items in an agency notice that is needed to process the agency notice using currently available techniques such as a template based optical recognition system. As a result, one or more technical solutions may provide a technical effect of enabling an artificial intelligence system to process agency notices with greater accuracy as compared to current techniques after training using historical data from historical agency notices and annotations generated for the historical data.

Computer system 210 can be configured to perform at least one of the steps, operations, or actions described in the different illustrative examples using software, hardware, firmware or a combination thereof. As a result, computer system 210 operates as a special purpose computer system in which trainer 229 in computer system 210 enables training an artificial intelligence system to process agency notices. In particular, trainer 229 transforms computer system 210 into a special purpose computer system as compared to currently available general computer systems that do not have trainer 229.

In the illustrative example, the use of trainer 229 in computer system 210 integrates processes into a practical application for a method of training an artificial intelligence system that increases the performance of computer system 210. In other words, trainer 229 in computer system 210 is directed towards a practical application of processes integrated into trainer 229 in computer system 210 that identifies historical data from previously processed agency notices and generates annotations for historical text in the historical data. Trainer 229 trains the artificial intelligence system using historical data and the annotations.

In this illustrative example, trainer 229 in computer system 210 utilizes annotations to train an artificial intelligence system using one or more machine learning algorithms in a manner that that results in an artificial intelligence system that is capable of processing agency notices with a desired level of accuracy. In this manner, trainer 229 in computer system 210 provides a practical application of a method for training an artificial intelligence system to process agency notices such that the functioning of computer system 210 is improved when processing agency notices using the trained artificial intelligence system. For example, computer system 210 with a trained artificial intelligence system can process agency notices received from clients with a greater level of accuracy as compared to currently available computer systems that employ a template based optical recognition system and as compared to having human operators process the agency notices.

Figure 3:
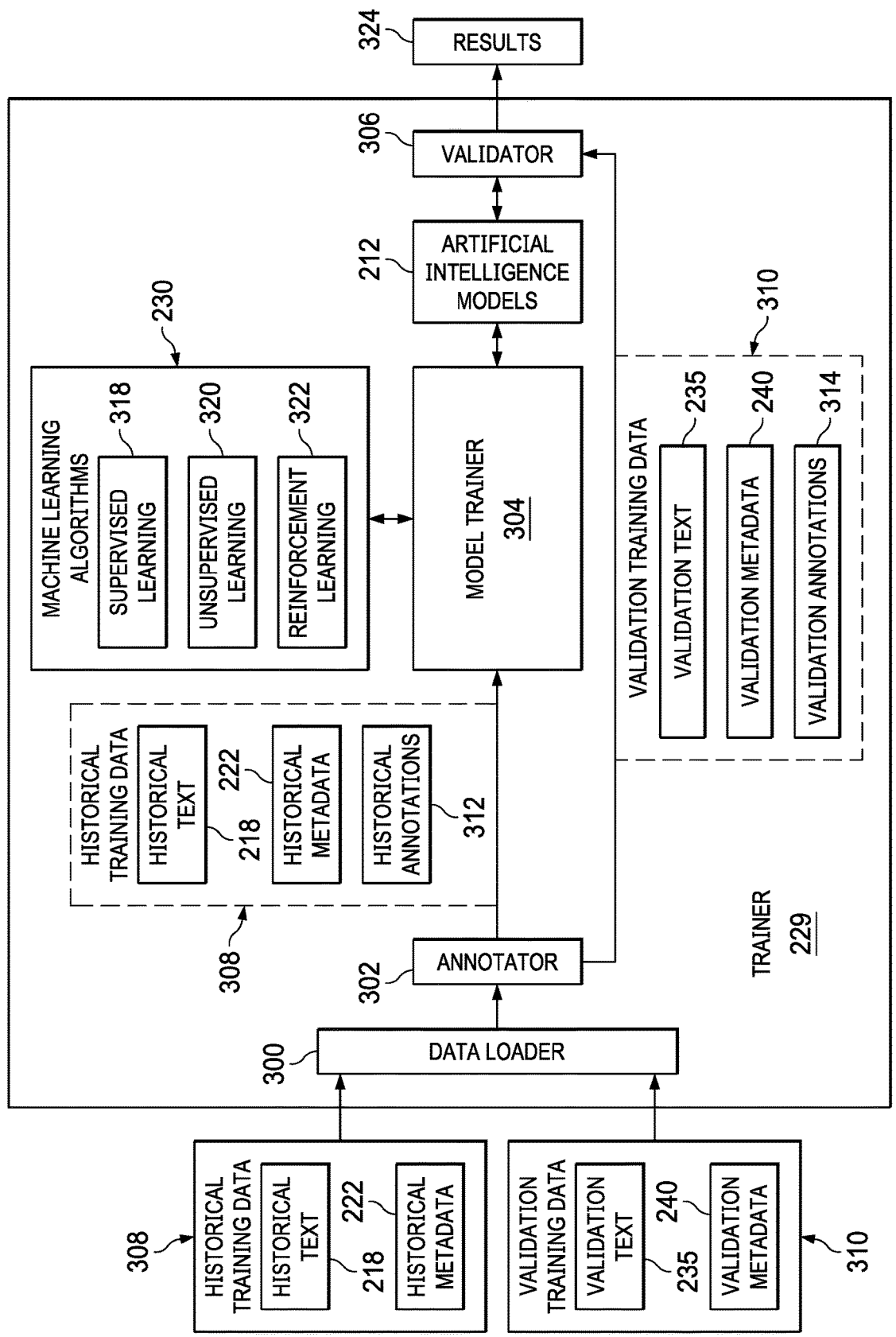
FIG. 3 is a block diagram of a trainer in accordance with an illustrative embodiment.

With reference next to FIG. 3, a block diagram of a trainer is depicted in accordance with an illustrative embodiment. In the illustrative examples, the same reference numeral may be used in more than one figure. This reuse of a reference numeral in different figures represents the same element in the different figures. In this depicted example, components that can be used to implement trainer 229 are shown. As depicted, trainer 229 includes data loader 300, annotator 302, model trainer 304, and validator 306.

As depicted, data loader 300 in trainer 229 loads historical data 216 and validation data 232 for use in training artificial intelligence models 212 in artificial intelligence system 206. Historical data 216 and validation data 232 are for agency notices 204 that have been previously processed. This data can be located in a database, a flat file, a table, other type of data structure.

In this illustrative example, annotator 302 builds historical training data 308 and validation training data 310. As depicted, historical training data 308 comprises historical text 218, historical metadata 222, and historical annotations 312. Validation training data 310 comprises validation text 235, validation metadata 240, and validation annotations 314. In this illustrative example, historical annotations 312 and validation annotations 314 are examples of annotations 226 shown in block form in FIG. 2.

Annotator 302 places historical training data 308 and validation training data 310 into formats and groupings or clusters used in training artificial intelligence models 212. For example, text and annotations can be placed into JavaScript object notation (JSON) objects for use in training. Any suitable type of data format and data structure can be used based on the process used for performing training of artificial intelligence models 212.

Further, annotator 302 can perform quality checks on historical annotations 312 and validation annotations 314. For example, annotator 302 can check the quality of these annotations using the metadata to determine whether an annotation has an error. This error can be selected, for example, from a group comprising a missing annotation and an incorrect annotation.

Model trainer 304 trains artificial intelligence models 212 using historical training data 308 generated by annotator 302. In this illustrative example, training of artificial intelligence system 206 can be performed using a set of machine learning algorithms 230. The set of machine learning algorithms 230 can be machine learning algorithms that are selected from at least one of supervised learning 318, unsupervised learning 320, reinforcement learning 322, or other suitable types of machine learning algorithms.

In this illustrative example, supervised learning 318 comprises providing the artificial intelligence machine model with training data and the correct output value of the data. During supervised learning, the values for the output are provided along with the training data (labeled dataset) for the model building process. The algorithm, through trial and error, deciphers the patterns that exist between the input training data and the known output values to create an artificial intelligence model that can reproduce the same underlying rules with new data.

Examples of supervised learning algorithms include regression analysis, decision trees, k-nearest neighbors, neural networks, and support vector machines. Another example of a supervised learning algorithm that can be used to train artificial intelligence models 212 is Named Entity Recognition (NER), Deep Neural Network Classification.

If unsupervised learning 320 is used, not all of the variables and data patterns are labeled, forcing the artificial intelligence machine model to discover hidden patterns and create labels on its own through the use of unsupervised learning algorithms. Unsupervised learning 320 has the advantage of discovering patterns in the data with no need for labeled datasets. Examples of algorithms used in unsupervised machine learning include k-means clustering, association analysis, and descending clustering.

Whereas supervised learning 318 and unsupervised learning 320 learn from a dataset, reinforcement learning 322 learns from interactions with an environment. Algorithms such as Q-learning are used to train the predictive model through interacting with the environment using measurable performance criteria. With this type of training, historical training data 308 may be unnecessary.

As depicted, model trainer 304 can employ a different machine learning algorithm for each of the artificial intelligence models 212. As result, although the same training data can be used to train artificial intelligence models, different levels of accuracy can result from using different machine learning algorithms. Further, the same machine learning algorithms can be used with all of artificial intelligence models 212 but the manner in which data is grouped in historical training data 308 can be different for different artificial intelligence models. This difference in grouping of clustering of data can also affect the accuracy between different artificial intelligence models.

Validator 306 uses validation training data 310 in artificial intelligence models 212 to generate results 324. In this illustrative example, validation training data 310 is the same for all of artificial intelligence models 212 in obtaining results 324 from artificial intelligence models 212.

As depicted, validator 306 determines the level of accuracy for the different models in artificial intelligence models 212 using results 324. Validator 306 can select the artificial intelligence model in artificial intelligence models 212 having the highest accuracy.

Further, if the artificial intelligence model having the highest accuracy is insufficient in the level of accuracy, further training of artificial intelligence models 212 can be performed by model trainer 304. In performing further training, model trainer 304 can change at least one of historical training data 308 or machine learning algorithms 230.

For example, model trainer 304 can change the clustering of data in historical training data 308. For example, instead of clustering data based on agency, the data can be clustered based on the geographic location from which the agency notices originated. Further, model trainer 304 can select a different machine learning algorithm for the continued training with the different clustering of data.

As a result of analyzing results 324, validator 306 can select one or more of artificial intelligence models 212 for publication. When an artificial intelligence models is published, the artificial intelligence model is made available for use in processing agency notices.

Figure 4:
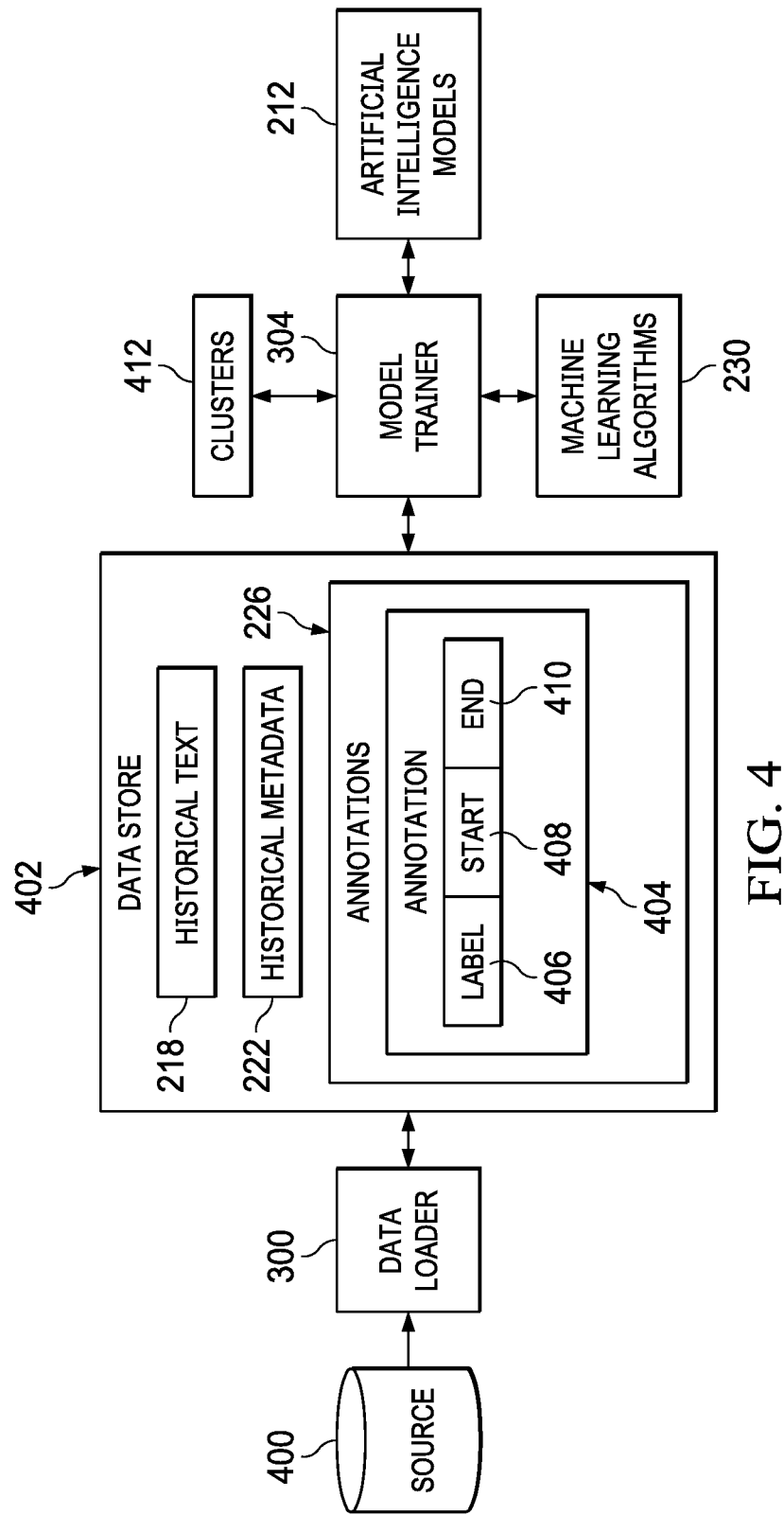
FIG. 4 is an illustration of data flow for training an artificial intelligence model in accordance with an illustrative embodiment.

With reference next to FIG. 4, an illustration of data flow for training an artificial intelligence model is depicted in accordance with an illustrative embodiment. In this illustrative example, data loader 300 retrieves historical text 218 and historical metadata 222 from source 400. As depicted, source 400 can be a database, a file, a table, or some other suitable type of data structure in a data store.

The data loader 300 stores historical text 218 in historical metadata 222 in data store 402. In this illustrative example, data store 402 is used to manage collections of data. These collections of data can include, for example, at least one of a database, a file, metadata, or other types of data.

In this illustrative example, annotator 302 accesses historical text 218 and historical metadata 222 in data store 402 and creates annotations 226. As depicted, annotations 226 are stored in data store 402.

In this illustrative example, annotation 404 in annotations 226 comprises label 406, start 408, and end 410. Label 406 identifies the item. For example, label 406 can be selected from a group comprising an agency address, an agency name, a notice date, an agency state, a company name, an amount, an employer identifier, and other suitable types of items. Start 408 identifies the starting location of the item in historical text 218 and end 410 identifies the ending location the item in historical text 218.

In this illustrative example, annotation 404 can be derived using historical metadata 222. Historical metadata 222 identifies items and their values. In this illustrative example, this metadata is used to perform services for a client. As depicted, the metadata is also used to generate annotations for use in training artificial intelligence system 206.

The items in the values can be used to locate the items in historical text 218. In this illustrative example, annotations 226 can take a number of different forms. For example, annotations 226 can be stored in one or more JavaScript object notation (JSON) objects. Other types of data structures can be used in the particular patient. For example, the data structures can be any type of data structure that includes attribute-value pairs.

As depicted, model trainer 304 retrieves historical text 218, historical metadata 222, and annotations 226. Further, model trainer 304 can perform clustering on this data. Clustering is a manner in which agency notices are grouped for training.

For example, historical text 218, corresponding metadata in historical metadata 222, and corresponding annotations in annotations 226 can be placed into clusters 412. For example, historical text 218, historical metadata 222, and annotations 226 for an agency notice can be grouped together and placed into a cluster with data for other agency notices. Each agency notice in a cluster will have historical text 218, historical metadata 222, and annotations 226 that relate to that agency notice. These clusters can be, for example, based on a form for the agency notices, a state from which the agency notices originate, a government agency from which the notices originate, or other suitable parameters.

In this illustrative example, model trainer 304 selects one or more machine learning algorithms in machine learning algorithms 230 for use in one or more artificial intelligence models in artificial intelligence models 212. The training is then performed using the selected machine learning algorithms and clusters 412 of historical text 218, historical metadata 222, and annotations 226.

Figure 5:
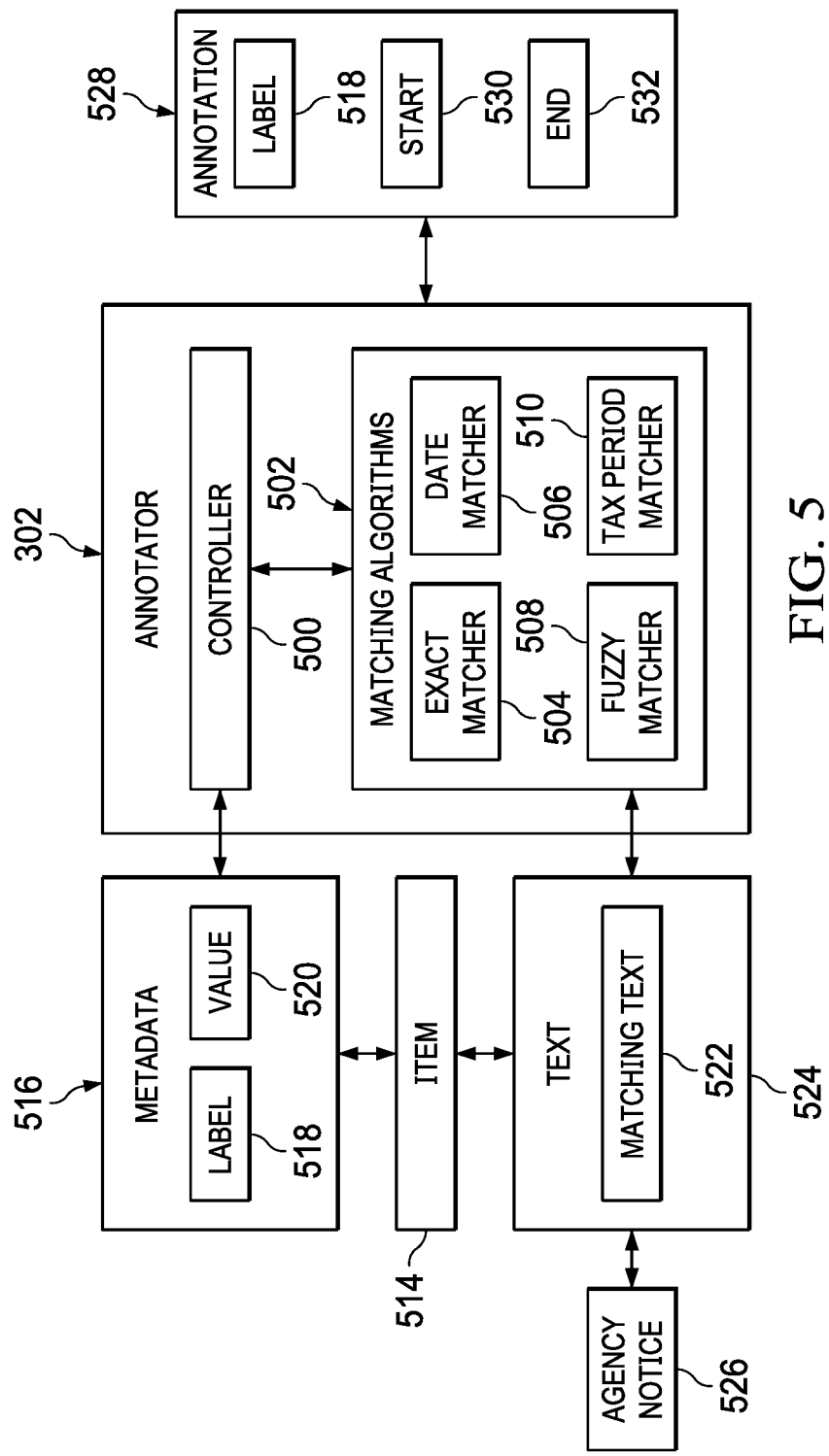
FIG. 5 is a block diagram of an annotator in accordance with an illustrative embodiment.

Turning to FIG. 5, a block diagram of an annotator is depicted in accordance with an illustrative embodiment. In this illustrative example, examples of components that can be used to implement annotator 302 are shown. As depicted, annotator 302 includes controller 500 and matching algorithms 502. As depicted, matching algorithms 502 include exact matcher 504, date matcher 506, fuzzy matcher 508, and tax period matcher 510. These components are used to identify items within text for agency notice. These components implement processes for search algorithms to search the text of an agency notice for particular items.

In this illustrative example, controller 500 identifies items for annotation from metadata describing the text for an agency notice. For example, metadata 516 for item 514 includes label 518 and value 520. Value 520 is a value for label 518.

Depending on the manner in which value 520 is formatted in metadata 516, value 520 may not be exact match for matching text 522 in text 524 for agency notice 526.

Controller 500 identifies matching text 522 in text 524 for agency notice 526 from label 518 and value 520 in metadata 516 for item 514. As depicted, matching text 522 is identified by controller 500 using matching algorithms 502. In this illustrative example, the search can be performed using at least one of exact matcher 504, date matcher 506, fuzzy matcher 508, or tax period matcher 510.

In this illustrative example, exact matcher 504 searches for an exact match between value 520 and matching text 522 in text 524. Exact matcher 504 can implement string searching algorithms to search for the exact match between value 520 and matching text 522. For example, exact matcher 504 can be used to identify text for items such as sitting, ZIP Code, amount, or other suitable items.

As depicted, date matcher 506 can match a date in value 520 in metadata 512 with matching text 522 in text 524 even when the format of the date between value 520 and matching text 522 is different. For example, value 520 the date may be day, month year, while matching text 522 may have a date format of month, day, year. Date matcher 506 provide the capability to match dates between value 520 and matching text 522 when the formats for the dates is different. In this manner, value 520 in the metadata can have the same format for the dates even though text for the date can change in agency notices from different agencies or for different forms.

In other words, value 520 in metadata 516 can always have the same value. Date matcher 506 identifies matching text 522 containing the date even though the formats may be different from value 520 in generating annotation 528.

In this illustrative example, fuzzy matcher 508 can be used to search for an approximate match to annotated text 524 in matching text 522 in text 524. For example, when label 518 is a company name, value 520 in metadata 516 may be different from the matching text 522 in text 524 for value 520.

For example, value 520 may be "ABC, Inc." for a company name. In this illustrative example, value 520 is the information stored in a database for the client. However, the company name may be "ABC Incorporated" in text 524. As result, matching text 522 is "ABC Incorporated", which is identified using fuzzy matcher 508. In this manner, the company name in agency notice 526 can be matched up to the company name in the database for the client even though the company name in the database does not have the same exact text as in the agency notice.

Tax period matcher 510 can be used when the tax period identified in metadata 516 is not in the same format as matching text 522. For example, item 514 in metadata 516 can be tax period with the format 2018 Q1. Item 514 in matching text 522 for item 514 can be 2018 1st quarter. Tax period matcher 510 is designed to matchup tax periods that have different formats between value 520 and matching text 522.

Using matching algorithms 502, controller 500 identifies matching text 522 in text 524 for item 514. With this identification, controller 500 generates annotation 528 having label 518, start 530, and end 532. Label 518 identifies item 514. Start 530 identifies the starting location of matching text 522 in text 524, and end 532 identifies the end of matching text 522 in text 524 for the items identified using label 518. For example, annotation 528 can be ("amount": 14,54) in which "amount" is the label, 14 is the starting location of matching text 522 in text 524, and 54 is the ending location of matching text 522 in text 524.

Figure 6:
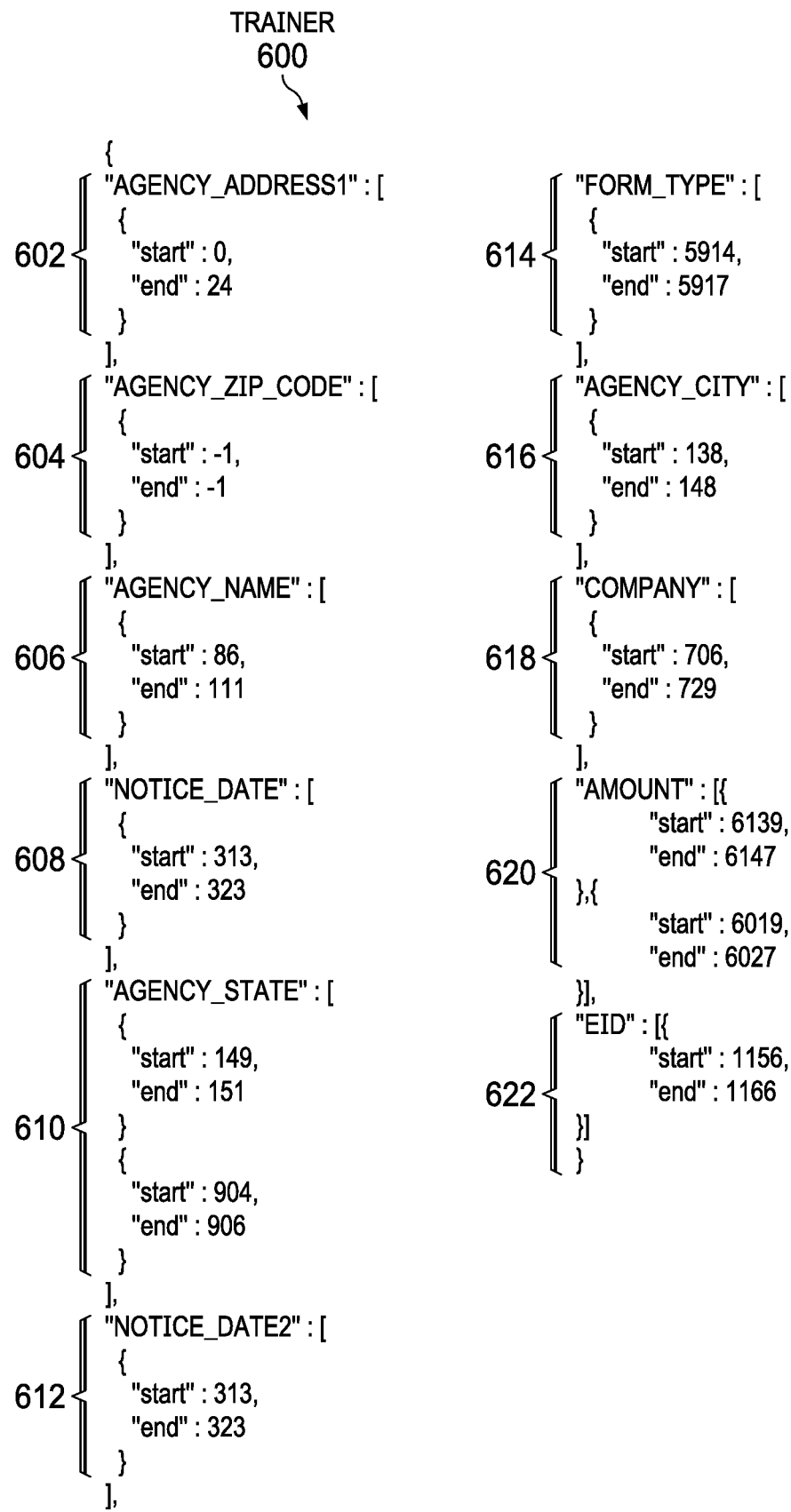
FIG. 6 is an illustration of an object containing annotations in accordance with an illustrative embodiment.

With reference now to FIG. 6, an illustration of an object containing annotations is depicted in accordance with an illustrative embodiment. In this illustrative example, object 600 is a JSON object containing annotations that identify items in text for an agency notice.

As depicted, the annotations in object 600 comprises agency address 602, agency ZIP code 604, agency names 606, notice date 608, agency state 610, notice date 612, formed time 614, agency city 616, company 618, amount 620, and employer identifier 622. Each of these annotations comprises a label start position within the text of the agency notice, and an end a position within the text of the agency notice. In this illustrative example, object 600 also can include the text used to generate the annotations.

The illustration of notice processing environment 200 and the different components in notice processing environment 200 in FIGS. 2-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more artificial intelligence systems in addition to artificial intelligence system 206 may be present in notice processing environment 200. In some illustrative examples, validating the training of artificial intelligence system 206 may be omitted.

In still other examples, one or more agency notice processing services can be present in addition to or in place of agency notice processing service 258. The other agency notice processing services may use the same or different artificial intelligence models. In other words, multiple services may access the same artificial intelligence model some illustrative examples.

As another illustrative example, annotator 302 can use other types of in addition to those shown in matching algorithms 502. For example, tax period matcher 510 may be omitted in some illustrative examples. As another example, a specialized matcher for matching amounts in different formats may be used in matching algorithms 502.

Figure 7:
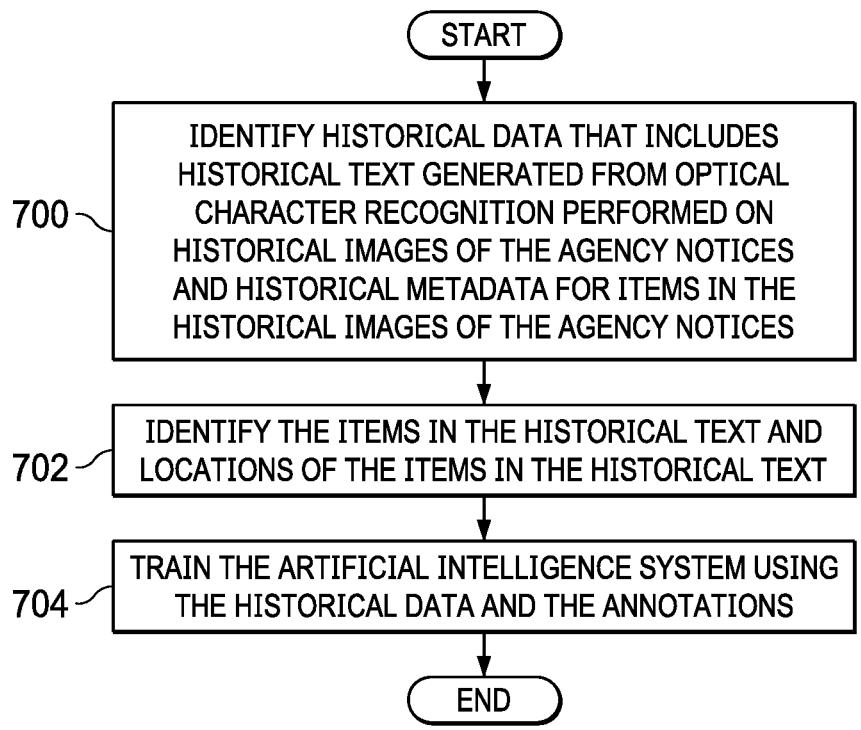
FIG. 7 is a flowchart of a process for training an artificial intelligence system to process agency notices in accordance with an illustrative embodiment.

Turning next to FIG. 7, a flowchart of a process for training an artificial intelligence system to process agency notices is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in trainer 229 in computer system 210 in FIG. 2.

The process begins by identifying historical data that includes historical text generated from optical character recognition performed on historical images of the agency notices and historical metadata for items in the historical images of the agency notices (step 700). The process generates annotations for the historical text (step 702). In step 702, the annotations identify the items in the historical text and locations of the items in the historical text.

The process trains the artificial intelligence system using the historical data and the annotations (step 704). The process terminates thereafter.

Figure 8:
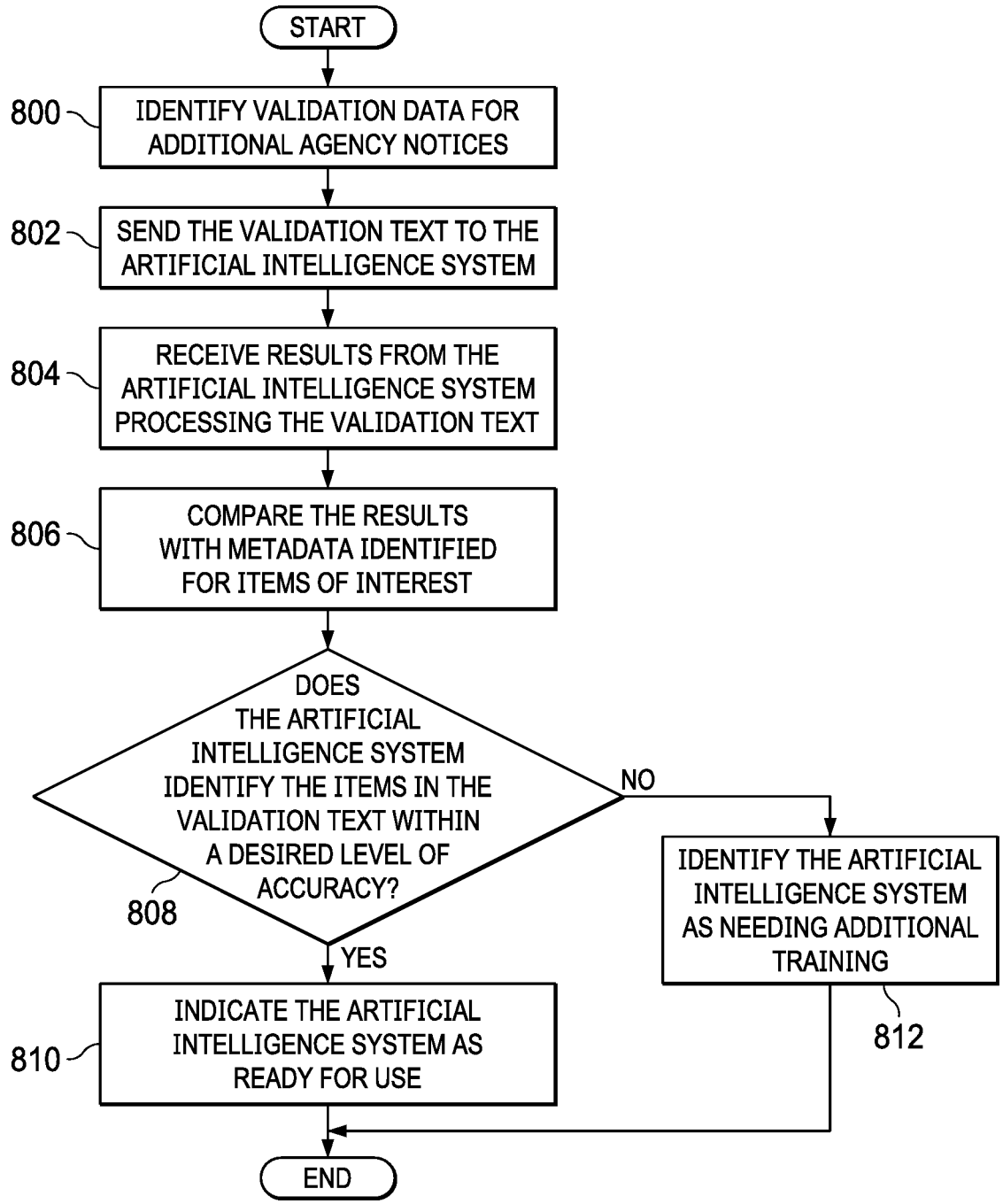
FIG. 8 is a flowchart of a process for validating training of an artificial intelligence system in accordance with an illustrative embodiment.

With reference next to FIG. 8, a flowchart of a process for validating training of an artificial intelligence system is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in trainer 229 in computer system 210 in FIG. 2.

The process begins by identifying validation data for additional agency notices (step 800). The validation data in step 800 includes validation text generated from optical character recognition performed on validation images of additional agency notices and validation metadata for the items in the validation images of the additional agency notices.

The process sends the validation text to the artificial intelligence system (step 802). In step 802, the validation text can be sent one or more artificial intelligence models in the artificial intelligence system when the artificial intelligence system contains more than one artificial intelligence model.

The process receives results from the artificial intelligence system processing the validation text (steps 804). The process compares the results with metadata identified for items of interest (step 806).

The process determines whether the artificial intelligence system identifies the items in the validation text within a desired level of accuracy (step 808). The determination in step 808 can be made for each artificial intelligence model in artificial intelligence system.

Whether the artificial intelligence system is considered to identify items within a desired level of accuracy depends on the policy being used determine whether the artificial intelligence system provides a desirable accuracy. For example, the artificial intelligence system can be considered to meet the level of accuracy if one artificial intelligence system model in artificial intelligence system provides a desirable accuracy. In another illustrative example, the artificial intelligence system is considered to meet the desires desired level of accuracy if all artificial intelligence models in artificial intelligence system meet the desired level of accuracy.

If the items identified by the artificial intelligence system in the validation text are identified within a desired level of accuracy, the process indicates the artificial intelligence system as ready for use (step 810). The process terminates thereafter. Indication in step 810 can take a number of different forms. For example, indication can identify each artificial intelligence system model in artificial intelligence system that meets be desirable accuracy. In another example, indication can identify the artificial intelligence system model having the highest level of accuracy as compared to the other artificial intelligence system models as well as meeting the desired level of accuracy.

Otherwise, process identifies the artificial intelligence system as needing additional training (step 812). The process terminates thereafter.

Figure 9:
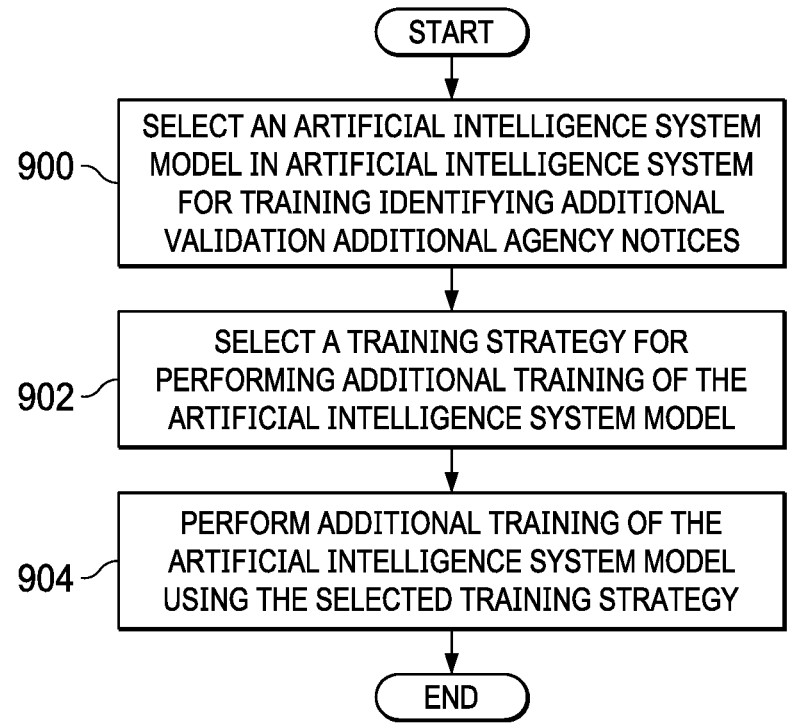
FIG. 9 is a flowchart of a process for performing additional training of an artificial intelligence model in artificial intelligence system in accordance with an illustrative embodiment.

With reference next to FIG. 9, a flowchart of a process for performing additional training of an artificial intelligence model in artificial intelligence system is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in trainer 229 in computer system 210 in FIG. 2.

The process begins by selecting an artificial intelligence system model in artificial intelligence system for training identifying additional validation additional agency notices (step 900). The artificial intelligence system model can be identified based on the results from that validating the artificial intelligence system in the process described in the flowchart in FIG. 8. For example, an artificial intelligence system model that does not provide a desirable level of accuracy can be selected as needing additional training. As another example, an artificial intelligence system model that is already published for use in processing agency notices can be selected for further training in response to a periodic event or a nonperiodic event.

In this illustrative example, a nonperiodic event can be, for example, an introduction of one or more new forms in the agency notices being processed. Further, the artificial intelligence system model can be trained periodically such as each month, each week, every day, every five days, or some other suitable period of time.

The process selects a training strategy for performing additional training of the artificial intelligence system model (step 902). In this illustrative example, the training strategy can take a number of different forms.

For example, the training strategy can include additional training of the artificial intelligence system model in the artificial intelligence system using additional historical data that has not been previously used to train the artificial intelligence system model. This additional historical data includes additional historical text generated from the optical character recognition performed on additional historical images of additional agency notices and additional historical meta data for the items in the additional historical images of the additional agency notices. The training also uses additional annotations identifying the items and locations of the items in the additional historical text in response to the desired level of accuracy being absent in the artificial intelligence system.

In another illustrative example, the selected training strategy can include utilizing a new machine learning algorithm to perform the additional training. With this strategy, the same or different historical data and annotations can be used for additional training.

In still another illustrative example, the strategy can utilize a change in clustering of historical data. With this strategy, the same historical data is used. However, a different type of clustering from the clustering employed in the previous training is used to organize the historical data for the additional training of the artificial intelligence system model. This training strategy can be performed using the same or different machine learning algorithm.

In yet another illustrative example, some combination of the different strategies can be employed to perform the additional training of the artificial intelligence system model. These training strategies are presented as examples of some training strategies that can be used and not meant to limit manner in which change strategies can be selected or created for training the artificial intelligence system model.

The process performs additional training of the artificial intelligence system model using the selected training strategy (step 904). The process terminates thereafter.

Figure 10:
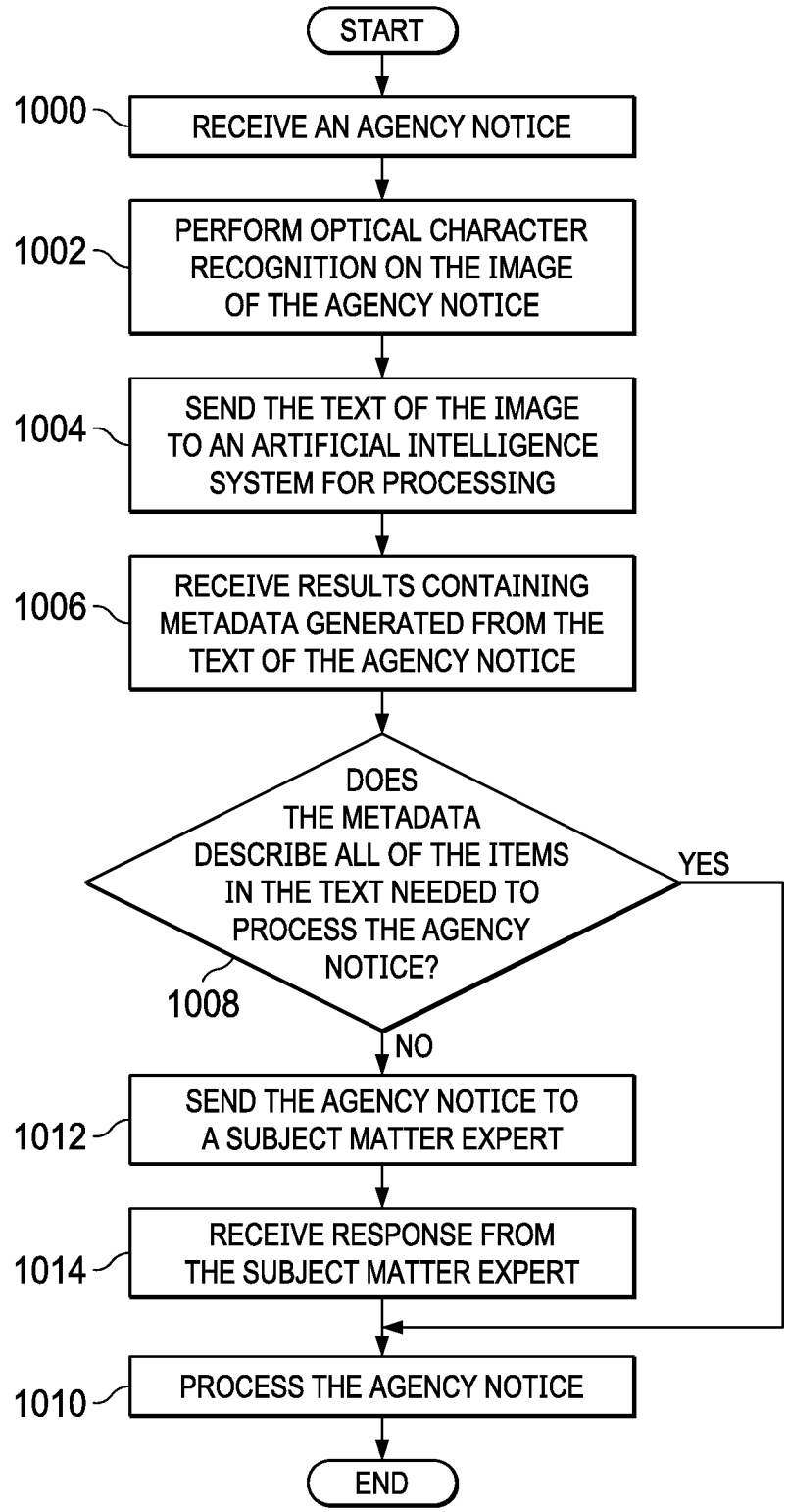
FIG. 10 is a flowchart of a process for processing agency notices using an artificial intelligence system model in artificial intelligence system in accordance with an illustrative embodiment.

With reference now to FIG. 10, a flowchart of a process for processing agency notices using an artificial intelligence system model in an artificial intelligence system is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in notice processor 264 in computer system 210 in FIG. 2.

The process illustrated in this flowchart provides a practical application of the use of an artificial intelligence system model trained by trainer 229 in accordance with an illustrative embodiment.

The process begins by receiving an agency notice (step 1000). In this illustrative example, the agency notice is received as an image file containing one or more images for the agency notice. If the agency notice is received as a paper document, that agency notice can be scanned to form an image for use in step 1000.

The process performs optical character recognition on the image of the agency notice (step 1002). Although step 1002 recites processing a single image, the step is intended include processing any and all images that are received for the agency notice.

The process then sends the text of the image to an artificial intelligence system for processing (step 1004). In step 1004, the text can be sent to a particular artificial intelligence system model in the artificial intelligence system.

The process receives results containing metadata generated from the text of the agency notice (step 1006). In this illustrative example, metadata contains items in the agency notice needed to process the agency notice for a client. For example, the metadata can include for items such as selected from of least one of an agency, a client organization, a notice type, an amount, notice period, agency name, an agency address, agency contact, an agency state, a company name, an employer identifier, a notice date, a notice period, a form number, or other type of item identifying information in the text that is needed to process an agency notice.

The process determines whether the metadata describes all of the items in the text needed to process the agency notice (step 1008). If metadata is sufficient, the process proceeds to process the agency notice (step 1010) with the process terminates thereafter.

For example, using the metadata, process can identify the at least one of the agency originating the agency notice, the client, tax information, an amount, a notice date, a due date, a form number, or other suitable information needed to process the agency notice. Further, the processing also can include updating information for the client, changing withholdings, changing payment schedules, generated alerts, or other suitable steps for processing the agency notice.

With reference again step 1008, if the metadata does not describe all the items in the text needed, the process sends the agency notice to a subject matter expert (step 1012). The process receives a response from the subject matter expert (step 1014). Process then proceeds to step 1010 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
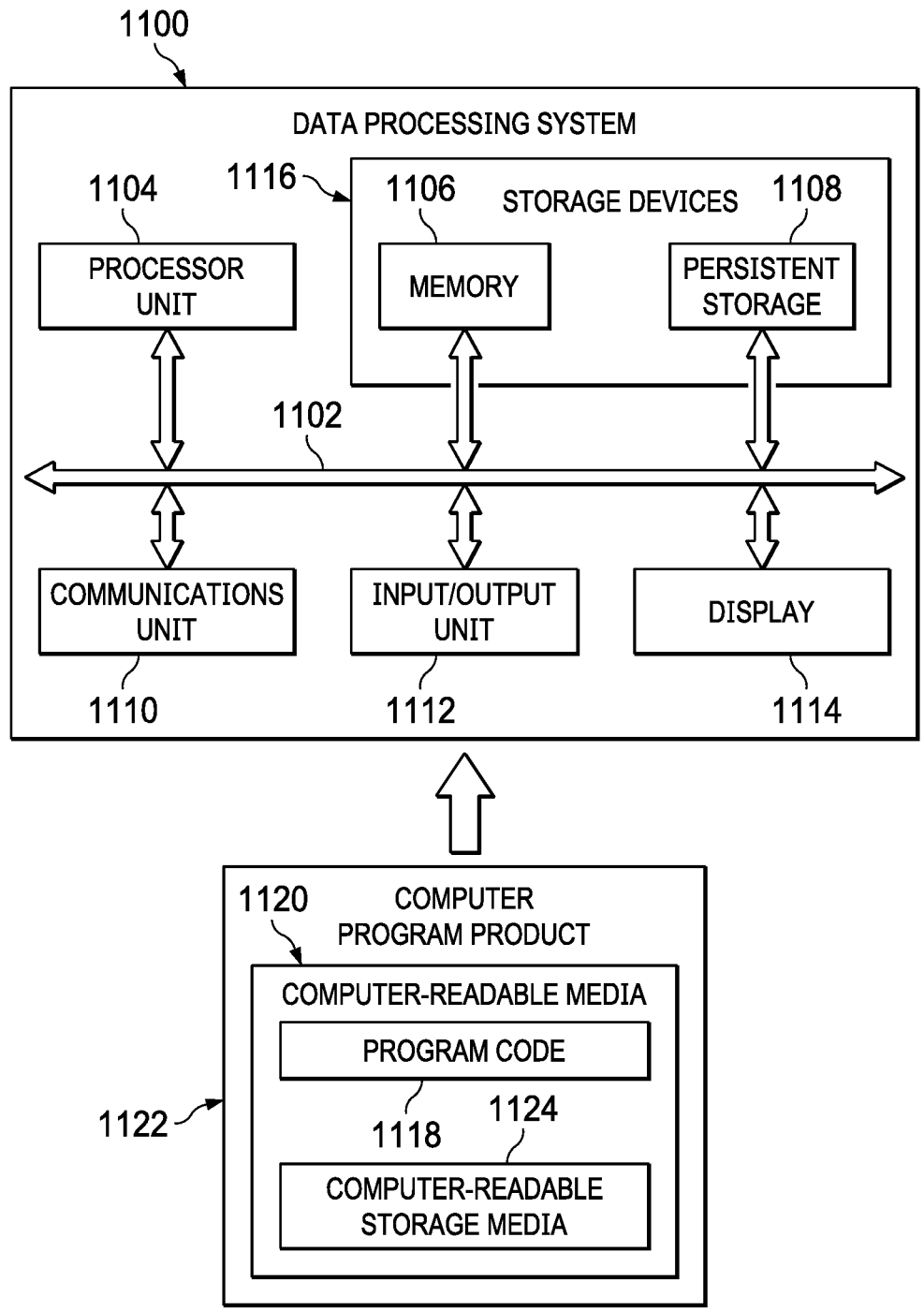
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement one or more data processing systems in computer system 210. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1008.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1002. The processes of the different embodiments can be performed by processor unit 1104 using computer-implemented instructions, which may be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1100 are not meant to provide architectural limitations to the manner in which different embodiments can be implemented. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 1106, or portions thereof, may be incorporated in processor unit 1104 in some illustrative examples. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Thus, the illustrative embodiments provide a method, apparatus, system, and computer program product for training an artificial intelligence system to process agency notices. In training an artificial intelligence system to process agency notices, the process identifies historical data that includes historical text generated from optical character recognition performed on historical images of the agency notices and historical metadata for items in the historical images of the agency notices. The process generates annotations for the historical text are generated. The annotations identify the items in the historical text and locations of the items in the historical text. The process trains the artificial intelligence system using the historical data and the annotations.

One or more illustrative examples provide a solution to a technical problem with identifying metadata for items in an agency notice needed to process the agency notice. By training an artificial intelligence system, issues with identifying metadata for items in an agency notice analyzed by a human operator or a template based optical recognition system can be reduced. For example, the errors or inconsistencies in identifying metadata for items in agency notices for use in processing those agency notices can be reduced as compared to current techniques. One or more illustrative examples provide one or more technical solutions in which the training an artificial intelligence system is performed using the text and metadata for items previously identified in agency notices. Annotations are created for the text for the agency notices. The text, metadata, and annotations can be used by machine learning algorithms to train an artificial intelligence system to identify metadata for items in agency notices even though exact matches may not be present between a search for values for the metadata in the text corresponding to those items in the agency notice.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for training an artificial intelligence system to process agency notices, the method comprising:
   identifying, by a computer system, historical data that includes historical text generated from optical character recognition performed on historical images of the agency notices and historical metadata for items in the historical images of the agency notices;
   generating, by the computer system, annotations for the historical text, wherein the annotations identify the items in the historical text and locations of the items in the historical text; and
   training, by the computer system, the artificial intelligence system using the historical data and the annotations.

2. The method of claim 1 further comprising:
   processing, by the artificial intelligence system, new agency notices received after the artificial intelligence system has been trained using the historical data and the annotations.

3. The method of claim 1, wherein training the artificial intelligence system using the historical data and the annotations comprises:
   training, by the computer system, the artificial intelligence system using the historical metadata in the historical data and the annotations.

4. The method of claim 1 further comprising:
   identifying, by the computer system, validation data for additional agency notices, wherein the validation data includes validation text generated from optical character recognition performed on validation images of additional agency notices and validation metadata for the items in the validation images of the additional agency notices;
   sending, by the computer system, the validation text to the artificial intelligence system;
   receiving, by the computer system, results from the artificial intelligence system processing the validation text; and
   determining, by the computer system, whether the artificial intelligence system identifies the items in the validation text within a desired level of accuracy.

5. The method of claim 4 further comprising:
   performing, by the computer system, additional training of the artificial intelligence system using additional historical data that includes additional historical text generated from the optical character recognition performed on additional historical images of additional agency notices and additional historical metadata for the items in the additional historical images of the additional agency notices and using additional annotations identifying the items and locations of the items in the additional historical text in response to the desired level of accuracy being absent in the artificial intelligence system.

6. The method of claim 4, wherein the artificial intelligence system is trained using a first machine learning algorithm and further comprising:
   performing, by the computer system, additional training of the artificial intelligence system using the historical data and the annotations and a second machine learning algorithm in response to a desired level of accuracy being absent.

7. The method of claim 4, wherein the historical data is organized using a first type of clustering and further comprising:
   performing, by the computer system, additional training of the artificial intelligence system using the historical data organized using a second type of clustering and the annotations in response to the desired level of accuracy being absent.

8. The method of claim 1 further comprising:
   checking a quality of the annotations using the metadata to determine whether an annotation has an error that is selected from a group comprising a missing annotation and an incorrect annotation.

9. The method of claim 1, wherein the items comprise at least one of an agency, an organization name, an employer identifier, a notice type, an amount, a notice date, or a notice period.

10. The method of claim 1, wherein the artificial intelligence system is a neural network with natural language processing.

11. An artificial intelligence training system comprising:
    a computer system that identifies historical data that includes historical text generated from optical character recognition performed on historical images of agency notices and historical metadata for items in the historical images of the agency notices; generates annotations for the historical text, wherein the annotations identify items in the historical text and locations of the items in the historical text; and trains the artificial intelligence system using the historical data and the annotations.

12. The artificial intelligence training system of claim 11, wherein the computer system processes new agency notices using the artificial intelligence system after the artificial intelligence system has been trained using the historical data and the annotations.

13. The artificial intelligence training system of claim 11, wherein in training the artificial intelligence system using the historical data and the annotations, the computer system trains the artificial intelligence system using the historical metadata in the historical data and the annotations.

14. The artificial intelligence training system of claim 11, wherein the computer system identifies validation data, wherein the validation data includes validation text generated from the optical character recognition performed on validation images of additional agency notices and validation metadata for the items in the validation images of the additional agency notices; sends the validation text to the artificial intelligence system; receives results from the artificial intelligence system processing the validation text; and determines whether the artificial intelligence system identifies the items in the validation text within a desired level of accuracy.

15. The artificial intelligence training system of claim 14, wherein the computer system performs additional training of the artificial intelligence system using additional historical data that includes additional historical text generated from the optical character recognition performed on additional historical images of additional agency notices and additional historical metadata for the items in the additional historical images of the additional agency notices and using additional annotations identifying the items and locations of the items in the additional historical text in response to the desired level of accuracy being absent in the artificial intelligence system.

16. The artificial intelligence training system of claim 14, wherein the artificial intelligence system is trained using a first machine learning algorithm and wherein the computer system performs additional training of the artificial intelligence system using the historical data and the annotations and a second machine learning algorithm in response to the desired level of accuracy being absent.

17. The artificial intelligence training system of claim 14, wherein the historical data is organized using a first type of clustering and wherein the computer system performs additional training of the artificial intelligence system using the historical data organized using a second type of clustering and the annotations in response to the desired level of accuracy being absent.

18. The artificial intelligence training system of claim 11, wherein the computer system checks a quality of the annotations using the metadata to determine whether an annotation has an error that is selected from a group comprising a missing annotation and an incorrect annotation.

19. The artificial intelligence training system of claim 11, wherein the items comprise at least one of an agency, a client organization, a notice type, an amount, or a notice period.

20. The artificial intelligence training system of claim 11, wherein the artificial intelligence system is a neural network with natural language processing.

21. An artificial intelligence training system comprising:
a computer system;
a data loader in the computer system, wherein the data loader retrieves historical data that includes historical text generated from optical character recognition performed on historical images of agency notices and historical metadata for items in the historical images of the agency notices and retrieves validation data, wherein the validation data includes validation text generated from optical character recognition performed on validation images of additional agency notices and validation metadata for the items in the validation images of the additional agency notices;
an annotator in the computer system, wherein the annotator generates annotations for the historical text in which the annotations identify items and locations of the items in the historical text;
a trainer in the computer system, wherein trainer trains the artificial intelligence system using the historical data and the annotations; and
a validator in the computer system, wherein the validator sends validation text to the artificial intelligence system, receives results from the artificial intelligence system processing the validation text, and determines whether the artificial intelligence system identifies the items in the validation images within a desired level of accuracy.

22. A computer program product for training an artificial intelligence system to process agency notices, the computer program product comprising:
a computer-readable-storage media with first program code, second program code, and third computer-readable storage media;
first program code, stored on the computer-readable-storage media, for identifying historical data that includes historical text generated from optical character recognition performed on historical images of the agency notices and historical metadata for items in the historical images of the agency notices;
second program code, stored on the computer-readable-storage media, for generating annotations for the historical text, wherein the annotations identify items in the historical text and locations of the items in the historical text; and
third program code, stored on the computer-readable-storage media, for training the artificial intelligence system using the historical data and the annotations.

23. The computer program product of claim 22 further comprising:
fourth program code, stored on the computer-readable-storage media for processing, by the artificial intelligence system, new agency notices received after the artificial intelligence system has been trained using the historical data and the annotations.

24. The computer program product of claim 22, wherein the third program code comprises:
program code, stored on the computer-readable-storage media, for training the artificial intelligence system using the historical metadata in the historical data and the annotations.

25. The computer program product of claim 22, wherein the annotations are first annotations and further comprising:
fourth program code, stored on the computer-readable-storage media, for identifying validation data for additional agency notices, wherein the validation data includes validation text generated from optical character recognition performed on validation images of additional agency notices and validation metadata for the items in the validation images of the additional agency notices;
fifth program code, stored on the computer-readable-storage media, for sending the validation text to the artificial intelligence system;
sixth program code, stored on the computer-readable-storage media, for receiving results from the artificial intelligence system processing the validation text; and
seventh program code, stored on the computer-readable-storage media, for determining whether the artificial intelligence system identifies the items in the validation text within a desired level of accuracy.

26. The computer program product of claim 25 further comprising:
fourth program code, stored on the computer-readable-storage media, for performing additional training of the artificial intelligence system using additional historical data that includes additional historical text generated from the optical character recognition performed on additional historical images of additional agency notices and additional historical metadata for the items in the additional historical images of the additional agency notices and using additional annotations identifying the items and locations of the items in the additional historical text in response to the desired level of accuracy being absent in the artificial intelligence system.

27. The computer program product of claim 25, wherein the artificial intelligence system is trained using a first machine learning algorithm and further comprising:
fourth program code, stored on the computer-readable-storage media, for performing additional training of the artificial intelligence system using the historical data and the annotations and a second machine learning algorithm in response to a desired level of accuracy being absent.

28. The computer program product of claim 25, wherein the historical data is organized using a first type of clustering and further comprising:
fourth program code, stored on the computer-readable-storage media, for performing additional training of the artificial intelligence system using the historical data organized using a second type of clustering and the annotations in response to the desired level of accuracy being absent.

* * * * *